No. 812,983. PATENTED FEB. 20, 1906.
J. D. DAVIS.
COMBINED CORN PLANTER AND FERTILIZER DISTRIBUTER.
APPLICATION FILED JULY 24, 1905.

2 SHEETS—SHEET 1.

Witnesses
T. L. McKabie
R. C. Braddock.

Inventor
Joseph D. Davis
By
S. T. Wolhaupter,
Attorney

No. 812,983. PATENTED FEB. 20, 1906.
J. D. DAVIS.
COMBINED CORN PLANTER AND FERTILIZER DISTRIBUTER.
APPLICATION FILED JULY 24, 1905.

2 SHEETS—SHEET 2.

Witnesses
T. L. Mockain
R. C. Braddock.

Inventor
Joseph D. Davis

By L. P. Wolhaupter
Attorney

UNITED STATES PATENT OFFICE.

JOSEPH DANIEL DAVIS, OF PEACHLAND, NORTH CAROLINA, ASSIGNOR OF ONE-HALF TO JAMES H. DAVIS, OF PEACHLAND, NORTH CAROLINA.

COMBINED CORN-PLANTER AND FERTILIZER-DISTRIBUTER.

No. 812,983.     Specification of Letters Patent.     Patented Feb. 20, 1906.

Application filed July 24, 1905. Serial No. 271,048

*To all whom it may concern:*

Be it known that I, JOSEPH DANIEL DAVIS, a citizen of the United States, residing at Peachland, in the county of Anson and State of North Carolina, have invented certain new and useful Improvements in a Combined Corn-Planter and Fertilizer-Distributer, of which the following is a specification.

This invention relates to the class of seeders and planters, and has special reference to an improved combined corn-planter and fertilizer-distributer embodying simple and practical means for positively and accurately dropping a fixed quantity of seed at regularly-recurring intervals and simultaneously distributing a suitably-regulated quantity of fertilizer over the planted seed.

To this end the invention contemplates a machine of the character described embodying a common operating mechanism for the seed and fertilizer dropping devices which positively insures the synchronous action of these devices in order that they will always operate in perfect time.

Another object of the invention is to provide a novel construction of dropping device for both the seed and fertilizer whereby these devices may be properly cut off, while at the same time maintained perfectly clear, so as to be free from becoming obstructed through crowding or binding of the material.

With these and other objects in view, which will more readily appear as the nature of the invention is better understood, the same consists in the novel construction, combination, and arrangement of parts, which will be hereinafter more fully illustrated, described, and claimed.

The essential features of the invention involved in carrying out the objects above indicated are necessarily susceptible to structural change without departing from the scope of the invention; but a preferred embodiment thereof is shown in the accompanying drawings, in which—

Figure 1:
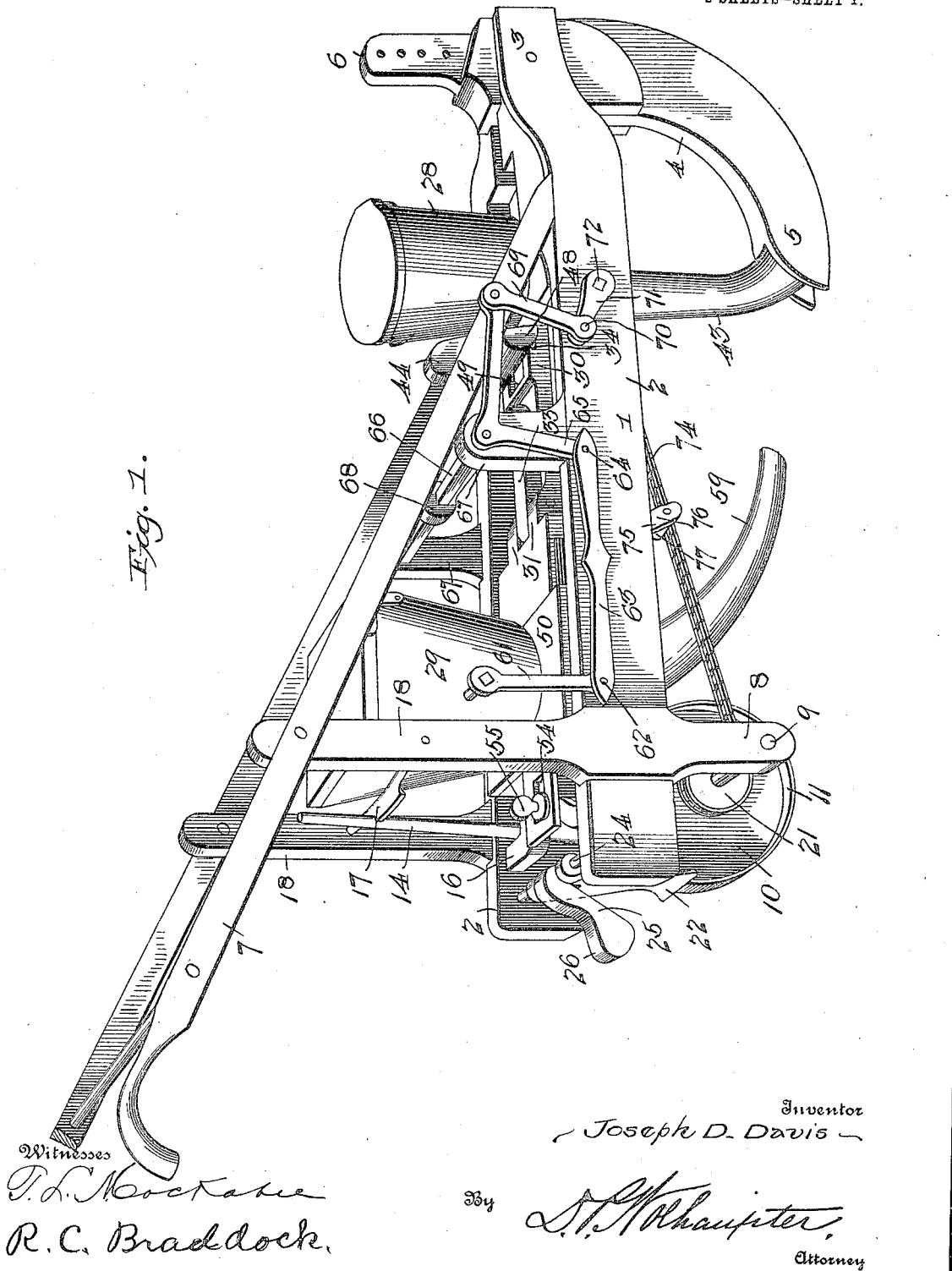
Figure 2:
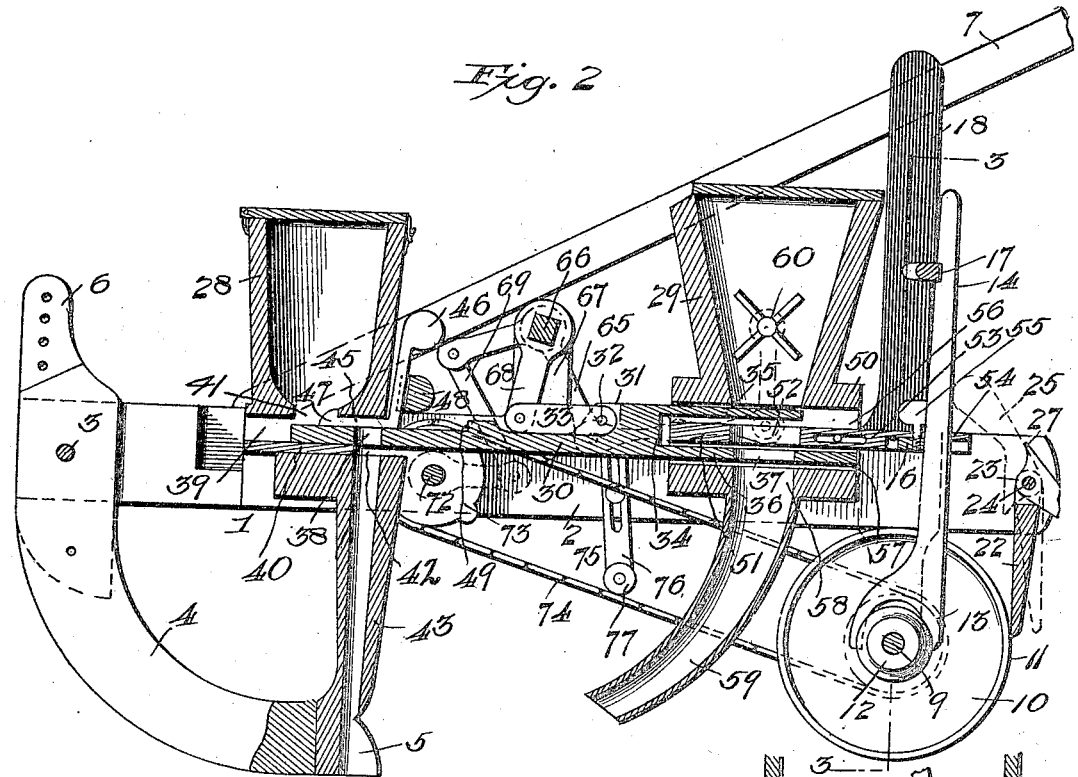
Figure 4:
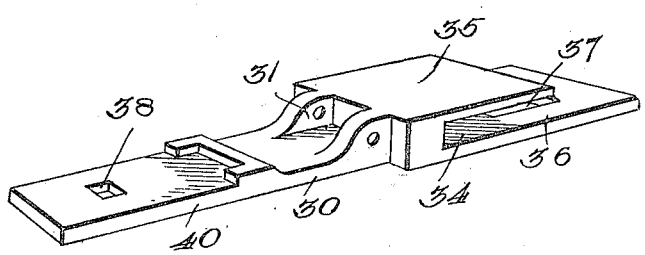
Figure 3:
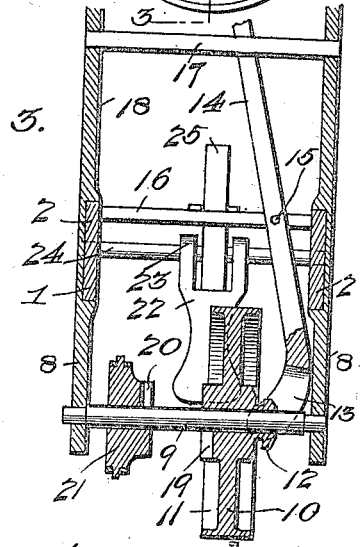

Figure 1 is a perspective view of a combined corn-planter and fertilizer-distributer constructed in accordance with the present invention. Fig. 2 is a vertical longitudinal sectional view of the machine. Fig. 3 is a vertical transverse sectional view on the line 3 3 of Fig. 2, and Fig. 4 is a detail in perspective view of the reciprocatory feeding-slide.

Like reference-numerals designate corresponding parts in the several figures of the drawings.

In carrying out the present invention the working parts are supported by a main carrying-frame 1 and essentially consisting of opposite parallel frame side bars 2, arranged in parallel spaced relation and rigidly braced and connected transversely by the various elements mounted therein. The said opposite side bars 2 of the carrying-frame are united at their front ends, as at 3, and rigidly connected at that point. This rigid connection between the front ends of the frame side bars may be utilized to secure in position the front runner or furrow-opener 4, having at its lower rear end an opening-shoe 5 of the form common to seed-planters of this type. Said front runner is illustrated as being provided with an upstanding clevis-arm 6, which is clamped between the front ends of the side bars 2 and projects above the latter to afford a connection for the clevis of the draft appliance.

At its rear end the main carrying-frame 1 supports a handle attachment 7, by means of which the operator controls the movement of the machine over the ground, and also at the rear end portions thereof the side bars 2 of the carrying-frame are provided with the pendent hanger-brackets 8, provided with suitable bearings receiving the opposite spindle extremities of the drive-shaft 9, upon which shaft is mounted the ground-wheel 10, having a wide covering-flange 11 to communicate motion to the working parts of the machine in a manner to be presently explained. At this point, however, it will be noted by reference to Fig. 3 of the drawings that the ground-wheel 10 is loosely mounted on the shaft 9, so as to be capable of sliding movement thereon, and at one side the said wheel carries a grooved shipper-collar 12, which is loosely engaged by the fork 13 at the lower end of a laterally-swinging shipper-lever 14, having a pivotal support intermediate its ends, as at 15, upon a transverse bracket-bar 16 and adapted to have its upper or handle portion engaged with the notched holding bar or segment 17, arranged transversely of and supported by the upstanding standards 18 of the handle attachment 7, as plainly shown in Fig. 3 of the drawings.

At the side of the loose ground-wheel 10, opposite the shipper connection therewith, the said wheel is provided with a clutch member or face 19, coöperating with a complemental clutch member or face 20, carried by the driving-sprocket 21, made fast on the drive-shaft 9. By manipulating the shipper-lever 14 it will be obvious that the ground-wheel may be readily clutched to and unclutched from the driving-sprocket 21. When clutched to the said driving-sprocket, the latter is caused to rotate with the shaft to provide means for transmitting motion to the working parts of the machine, and by unclutching the ground-wheel the same will rotate idly upon the shaft 9 without operating the dropping devices of the seed and fertilizer hoppers.

As indicated, the ground-wheel 10, with its flange 11, acts in the capacity of a coverer for covering up the hill opened by the shoe 5 after the dropping of the seed and the fertilizer, and in order to provide simple and practical means for cleaning the surface of the covering-flange 11 there is associated with the wheel a scraper-blade 22. This scraper-blade 22 is journaled on its upper end, as at 23, from a pivot-rod 24, secured at its ends in the opposite side bars 2 at the rear extremities of the latter, and to provide means for holding the said blade in and out of action there is employed a shiftable weighted holding-lever 25. This holding-lever is provided at one end with a weight portion 26 and at its other end is pivotally mounted on the rod 24 within a bifurcation at the upper end of the scraper-blade 22. At its pivoted end the said lever 25 is also provided with an engaging shoulder 27, adapted to bear against one side of the blade 22 when the lever 25 is thrown over to the dotted position shown in Fig. 2 for the purpose of holding the blade out of contact with the covering-flange of the ground-wheel. When the scraper is in action, the holding-lever is thrown over to the side of its pivot, (shown by full lines in Fig. 2,) thereby exerting a yielding pressure in a direction for maintaining the edge of the blade against the flange of the ground-wheel.

The main carrying-frame supports therein between the opposite side bars 2 thereof separate hoppers 28 and 29, arranged one in advance of the other and respectively holding a supply of seed and fertilizer. The dropping devices for the seed and fertilizer hoppers 28 and 29, respectively, include as a part thereof a common horizontal reciprocating feeding-slide 30, operating beneath both of the hoppers and coöperating therewith to provide for the dropping of the seed and fertilizer at properly-timed intervals. The reciprocatory feeding-slide 30 is provided intermediate its ends with pivot-ears 31, to which is pivotally coupled by the pivot 32 one end of a connecting-link 33, associated with the operating connections to be presently described. At one side of the link connection 33 the reciprocating feeding-slide 30 is provided with a feed-controlling fork 34, formed by an upper horizontal imperforate cut-off plate 35 and a lower discharging-plate 36. The lower discharging-plate 36 of the fork 34 is arranged parallel with the plate 35 and is of greater length than the same, said discharging-plate being further provided therein with a dropping pocket or opening 37, lying within the vertical plane of the plate 35, as will fully appear in connection with the dropping means for the fertilizer-hopper, as hereinafter described.

At the opposite side of its link connection 33 the common feeding-slide 30 is provided with a straight portion having near its outer end a seed-carrying pocket or opening 38. The portion of the slide having the pocket or opening 38 reciprocates in the horizontal guide-opening 39, formed in the slide-receiving base 40, supporting the seed-hopper 28. The slide-receiving base 40 may be either integral with or separate from the superimposed hopper 28, and the latter is provided in the bottom thereof with a seed-feed opening 41, while the base beneath the plane of the slide 30, but at one side of the vertical plane of the feed-opening, is provided therein with a drop-opening 42 in communication with the upper end of the seed-dropping spout 43, leading to the opening-shoe 5 of the runner 4.

As a part of the seed-dropping device for the seed-hopper 28 there is employed a self-adjusting cut-off and feeder 44. This device is preferably in the form of a bell-crank consisting of a horizontal cut-off shoe 45 and an upright weighted lever-arm 46. The said combined cut-off and feeder 44 is loosely arranged under the bottom portion of the rear wall of the hopper 28 and lies within the guide-opening 39 above the feeding-slide 30. The said horizontal shoe portion 45 is formed at its inner end with a shouldered regulating-nose 47, lying within one side of the seed-feed opening 41 in the bottom of the hopper 28. The upright weighted lever-arm 46 is arranged on the exterior of the hopper 28 and is held in position by an open guard-frame 48, carried by the base 40 of the hopper 28 and spaced in one side of the hopper to accommodate in the intervening space the said upright lever-arm 46.

From the construction described it will be obvious that the feeder 44 is free to adjust itself up and down to provide for readily clearing itself of seed or other obstructions coming between the same and the feeding-slide, while at the same time the shoe 45 necessarily acts as a cut-off for the seed-carrying pocket 38 as the same moves toward the opening 42 to deposit in the latter the seed within said pocket 38. Also in the operation of the machine a tappet-shoulder 49 on the slide 31 moves against the loose feeder 44 and vibrates or agitates the same sufficiently so that the regulating-nose 47 will be agitated sufficiently to loosen up the seed and facilitate its discharge through the opening 41 into the pocket 38 of the slide.

The fertilizer-hopper 29 is supported in a double-chambered feed-box 50, and said hopper 29 is provided with an open bottom, through which the fertilizer is worked out into the upper chamber or opening of the box. Said feed-box 50 is provided with a central horizontal partition 51, having therein a feed-opening 52, the size of which is regulated by means of an adjustable regulating-gate 53, slidably supported within and on the partition 51, provided at its outer end with a slotted adjustment-arm 54, receiving a binding screw or nut 55, engaging an opening in the transverse bracket-bar 16.

The partition 51 divides the box 50 into the upper and lower openings 56 and 57, respectively, the upper of said openings receiving the cut-off plate 35 and the lower of said openings receiving the discharging-plate 36. At the bottom the feed-box 50 is provided with a drop-opening 58 in communication with a delivery-spout 59, inclined forwardly toward the seed-dropping spout 43 to provide for distributing the fertilizer at the proper point. The hopper 29 accommodates therein a rocking spiked agitator 60, whose shaft is journaled in opposite sides of the hopper and one of the spindle extremities of which has connected thereto one end of a crank-arm 61. The other end of this crank-arm has a pivot connection 62 with one end of a connecting-rod 63, the other end of which rod has a pivot connection 64 with one arm of a bell-crank 65, mounted on one extremity of a rock-shaft 66, journaled in bearing-uprights 67, mounted on the side bars of the frame. The said rock-shaft 66 carries at an intermediate point a rocker-arm 68, which is pivoted to one end of the link 33 for the feeding-slide. The other arm of the said bell-crank 65 has pivoted thereto at one end an operating-link 69, the other end of which link is pivoted at 70 to a crank-arm 71 on one end of an operating counter-shaft 72, journaled transversely of the frame and carrying the sprocket-wheels 73, over which passes the driving chain or belt 74, which receives its motion from the driving-sprocket 21 when the ground-wheel 10 is clutched to the latter.

Intermediate the two sprocket-wheels there is preferably arranged the vertically-adjustable belt-tightener 75, consisting of an arm 76, adjustable on one of the side bars, and a pulley or roller 77, engaging one of the loads of the chain or belt.

From the connections described it will be obvious that when the ground-wheel is clutched to the driving-sprocket the feeding-slide will be reciprocated, and thereby cause the timed dropping of the seed and fertilizer as the machine advances. At the same time the rocking agitator within the fertilizing-hopper is worked to keep the material stirred up and agitated, so that it will freely feed down through the feed-opening 52 in the partition 51, so as to be caught up by the dropping-pocket 37 and deposited into the drop-opening 58 of the delivery-spout 59.

From the foregoing it is thought that the construction, operation, and many advantages of the herein-described corn-planter and fertilizer-distributer will be readily apparent without further description.

Having thus described the invention, what is claimed, and desired to be secured by Letters Patent, is—

1. In a machine of the class described, the frame, a seed-hopper having a bottom seed-opening and a slide-receiving base, the latter having a spout connection therewith, a self-adjusting cut-off and feeder having a shoe portion lying partly within the opening in the bottom of the seed-hopper, a fertilizer-hopper having a delivery-spout connection therewith, and a suitably-reciprocated feeding-slide having dropping members coöperating with the fertilizer-hopper and a single dropping member operating in the slide-receiving base of the seed-hopper beneath the said cut-off and feeder.

2. In a machine of the class described, the frame, a seed-hopper having a bottom seed-feed opening and a slide-receiving base having a spout connection therewith, a self-adjusting weighted cut-off and feeder having a shoe loosely arranged within said base and provided with a nose portion disposed within the seed-feed opening of the hopper, and a suitably-operated feeding-slide working in said slide-receiving base and having a seed-carrying pocket.

3. In a machine of the class described, the frame, a seed-hopper provided with a bottom seed-opening and a slide-receiving base having a spout connection therewith, a self-adjusting cut-off and feeder having a horizontal shoe portion loosely arranged within the slide-receiving base and an upright exterior weighted lever-arm rigid with said shoe portion, the latter being provided with a nose enlargement within the seed-feed opening of the hopper, and a suitably-operated feeding-slide working in said slide-receiving base and having a seed-carrying pocket.

4. In a machine of the class described, the frame, a seed-hopper mounted in the frame and provided with a slide-receiving base having a spout connection therewith, a fertilizer-hopper arranged in rear of the seed-hopper and provided with a horizontally-partitioned bottom feed-box provided with upper and lower slide-openings, the partition of said box being provided with a feed-opening and an adjustable regulating-gate having an exterior adjustment connection, and a suitably-operated reciprocating feed-slide having a perforated member working in the slide-receiving base of the seed-hopper, and a forked member consisting of an upper cut-off plate and a lower discharging-plate operating respectively in said upper and lower slide-openings of the feed-box, said lower discharging-plate being of greater length than the cut-off plate and having a dropping pocket or opening within the vertical plane of said cut-off plate.

5. In a machine of the class described, the frame, a seed-hopper and a fertilizer-hopper arranged one in advance of the other, a reciprocating feed-slide common to both of said hoppers and coöperating with the dropping means therefor, a rocking agitator arranged within the fertilizing-hopper, a rock-shaft having a rock-arm connection with the feed-slide and a similar connection with said rocking agitator, an operating-shaft journaled in the frame and carrying a crank-arm having a link-and-crank connection with said rock-shaft and carrying the belt-wheel, a drive-shaft carrying a fixed belt-wheel having a clutch member, a driving connection between the two belt-wheels, and a shiftable ground-wheel loosely mounted on the drive-shaft and having a clutch member for engagement with the complemental member of said driving-belt wheel.

In testimony whereof I affix my signature in presence of two witnesses.

JOSEPH DANIEL DAVIS.

Witnesses:
VERNON ALLEN,
THOS. V. HOWELL.